(12) United States Patent
Garrett et al.

(10) Patent No.: US 7,706,335 B2
(45) Date of Patent: *Apr. 27, 2010

(54) DOWNLINK COORDINATED TRANSMISSION IN OFDMA SYSTEMS

(75) Inventors: David Garrett, Santa Clara, CA (US); Bertrand M. Hochwald, Santa Clara, CA (US); Arogyaswami Paulraj, Santa Clara, CA (US); Djordje Tujkovic, Santa Clara, CA (US); Louay Jalloul, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/725,919

(22) Filed: Mar. 20, 2007

(65) Prior Publication Data

US 2007/0218954 A1   Sep. 20, 2007

Related U.S. Application Data

(60) Provisional application No. 60/783,936, filed on Mar. 20, 2006.

(51) Int. Cl.
 *H04J 3/00* (2006.01)
(52) U.S. Cl. ............ 370/336; 455/453; 455/436; 455/439; 455/442; 370/330; 370/331; 370/332; 370/333; 370/334; 370/335; 370/206; 370/337; 370/338; 370/339; 370/340; 370/341; 370/342; 370/344; 370/204; 370/319; 370/203

(58) Field of Classification Search ............ 455/453, 455/436, 439, 442; 370/330, 331, 332, 333, 370/334, 318, 343, 344
See application file for complete search history.

(56) References Cited

U.S. PATENT DOCUMENTS

| 6,738,637 | B1* | 5/2004 | Marinho et al. | 455/512 |
| 2002/0077111 | A1* | 6/2002 | Spaling et al. | 455/453 |
| 2004/0235510 | A1* | 11/2004 | Elicegui et al. | 455/522 |
| 2006/0166677 | A1* | 7/2006 | Derakshan et al. | 455/453 |
| 2006/0211441 | A1* | 9/2006 | Mese et al. | 455/522 |
| 2007/0217369 | A1* | 9/2007 | Garrett et al. | 370/336 |
| 2007/0270175 | A1* | 11/2007 | Malladi et al. | 455/522 |

* cited by examiner

*Primary Examiner*—Rafael Pérez-Gutiérrez
*Assistant Examiner*—Nimesh Patel

(57) ABSTRACT

Embodiments described herein include methods for improving the SINR, and therefore communication quality or rate, in the downlink of a cellular communication system. In an embodiment, the system is an orthogonal-frequency-division multiple-access (OFDMA) system. In an embodiment, a set of terminals is designated a coordinated-transmission group. The set of terminal is chosen such that the slot-allocations of the set are given special treatment to alleviate interference from other sectors or cells. All terminals within a coordination group generally use the same slot, but embodiments are not so limited.

23 Claims, 6 Drawing Sheets

DOWNLINK COORDINATED TRANSMISSION IN OFDMA SYSTEMS

CROSS-REFERENCE TO RELATED APPLICATIONS

This application claims the benefit of U.S. Provisional Patent Application No. 60/783,936, filed Mar. 20, 2006, which is incorporated by reference in its entirety herein.

This application is also related to copending U.S. patent application Ser. No. 11/725,920, entitled "Downlink Coordinated Transmission in OFDMA Systems, Including WiMax Systems", filed Mar. 20, 2007, which is incorporated by reference in its entirety herein.

TECHNICAL FIELD

The disclosed embodiments relate to wireless cellular communications systems and methods.

BACKGROUND OF THE DISCLOSURE

Cellular telephone users (cellular telephone users and cellular telephones are also referred to herein as "terminals") in the downlink (base station to terminal) path of a cellular system who are on or near the boundaries between cells or sectors usually have low signal-to-interference ratio (SINR) because of the strong interference from neighboring cells or sectors. These terminals often have poor connectivity with their respective base stations as a result.

FIG. 1 is a block diagram of a prior art cellular telephone system. FIG. 1 includes three cells, labeled A, B, C, in a typical arrangement. Each cell includes three respective sectors labeled 1, 2, and 3. The cell and sector boundaries are indicated by lines. Each sector typically serves its own set of terminals.

Typically the edge of a cell represents a boundary where the signal strength from a serving base station A (not shown) is comparable to the strength from one or more neighboring base stations (base station B, C, and so on, not shown). The transmissions from base station B, in contact with its own terminals, may then appear as interference to the terminal on the boundary, thus causing low SINR and impairing the data rate to the terminal.

In a similar fashion, the edge of a sector represents a boundary where the transmission beam-pattern allows transmissions from one sector to spill over into another sector as interference. Thus, a terminal being served in sector 1 may also see interfering transmissions from sectors 2 and 3. In an orthogonal-frequency-division multiple-access (OFDMA) system, time and frequency are usually divided into sub-units called symbols (in time t) and subcarriers (in frequency k). OFDMA systems are also referred to as orthogonal-frequency-duplex multiple-access systems. The base station typically assigns multiple time symbols and subcarriers to carry the data from the base station to the terminals. Each terminal within a sector is usually assigned a distinct subset of the available symbols and subcarriers. Such subsets of symbols and subcarriers are denoted "slots" herein. The number of subcarriers, the number of symbols, and the level of modulation (which is usually a function of the SINR) determines the data rate to the terminal.

In a "frequency re-use one" system, every cell and sector is free to utilize all of the subcarriers and symbols without regard for the subcarriers and symbols used in other cells or sectors. Such a system therefore has significant interference between sectors and cells, especially on their boundaries. In systems with higher frequency re-use, the interference tends to be less on sector and cell boundaries but can appear elsewhere.

One way of expressing the effect of interference in cellular communication systems is provided by Equations 1-3 below. In this example, Base station A transmits on subcarrier k and time t on Sector 1 the signal $$s_{k,t}^{(1)} = u_{k,t}^{(1)} \qquad \text{Equation 1}$$

where $u_{k,t}^{(1)}$ is a unit-energy data-symbol intended for a terminal in Sector 1. Base station A transmits on the same subcarrier k and time t on Sector 2 the signal $$s_{k,t}^{(2)} = u_{k,t}^{(2)} \qquad \text{Equation 2}$$

where $u_{k,t}^{(2)}$ is a data-symbol intended for a distinct terminal in Sector 2. The terminal in Sector 1 at time t and subcarrier k receives $$r_{k,t} = h_{k,t} u_{k,t}^{(1)} + g_{k,t} u_{k,t}^{(2)} + w_{k,t} \qquad \text{Equation 3}$$

where the channel between the terminal and its antenna (in Sector 1) is $h_{k,t}$ and $g_{k,t}$. The terminal might have trouble decoding its intended message $u_{k,t}^{(1)}$ if the channel magnitudes $|g_{k,t}|$ and $|h_{k,t}|$ are comparable.

Incorporation by Reference

All publications and patent applications mentioned in this specification are herein incorporated by reference to the same extent as if each individual publication or patent application was specifically and individually indicated to be incorporated by reference.

DETAILED DESCRIPTION

Figure 1:
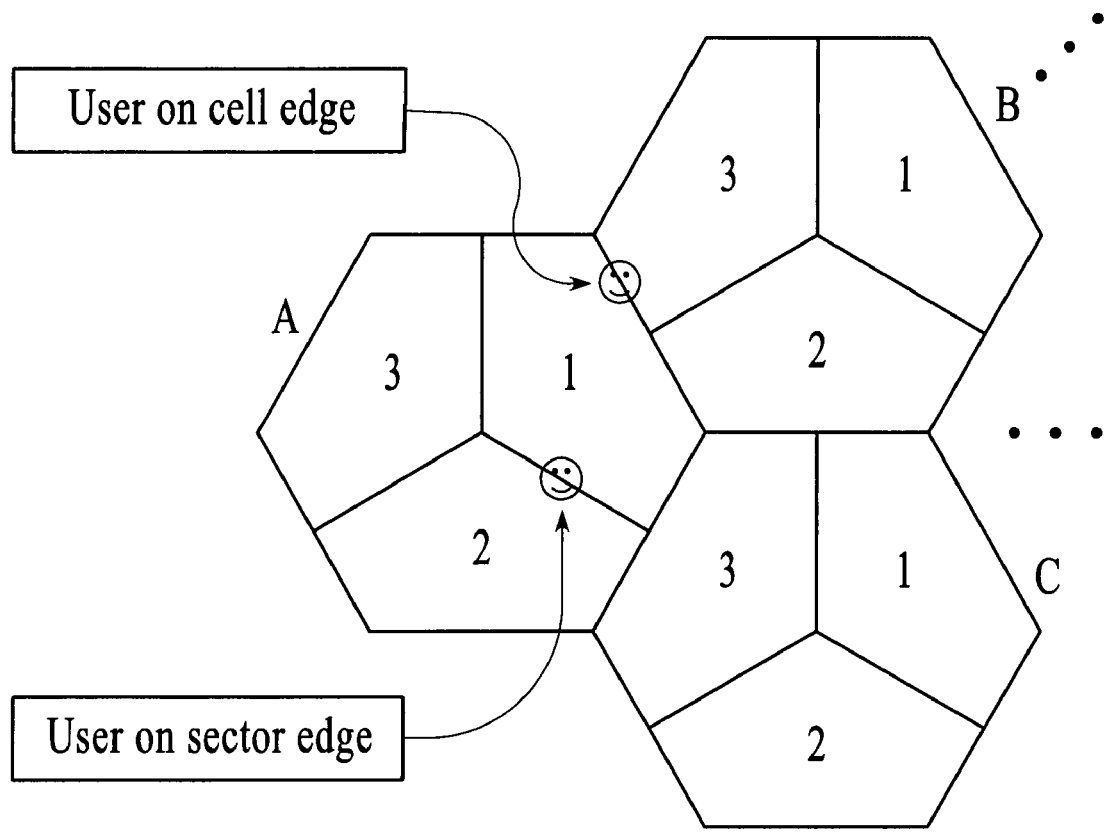
FIG. 1 is a block diagram of a prior art cellular telephone system.

Embodiments described herein include methods for improving the SINR, and therefore communication quality or rate, in the downlink of a cellular communication system. In an embodiment, the system is an orthogonal-frequency-division multiple-access (OFDMA) system. In an embodiment, a set of terminals is designated a coordinated-transmission group (also referred to herein as a "coordination group"). The set of terminal is chosen such that the slot-allocations of the set are given special treatment to alleviate interference from other sectors or cells. All terminals within a coordination group generally use the same slot, but embodiments are not so limited. Various embodiments are especially suitable for use in WiMax communication systems. A WiMax communication system conforms to a WiMax standard, such as IEEE 802.16, for example. The standard defines "zones" where terminals are scheduled according to their requirements for downlink traffic. As disclosed herein, zones are "repurposed" to handle the coordinated-transmission, although the zone was originally intended for another purpose. Various defined zones include dedicated pilots used by the terminals to learn the channel. In an embodiment, the transmission protocol is changed as required to align it across sectors or cells. Once this alignment (for example in time-frequency and pseudo-random sequence) is established, a base station can use one sector in the zone to augment the transmission in another sector in the zone.

Boundary terminals are on the boundary of a sector and/or a cell. Boundary terminals are thus usually relatively highly distressed, that is they suffer from greater interference than non-boundary terminals. Distressed terminals may have an SINR so low that they are not able to meet the minimum communication rate for the system. Boundary terminals are typically members of the coordination group. However, non-distressed "sacrificial" terminals may also be included in the coordination group. "Sacrificial terminals" as used herein includes terminals that are placed in a coordination group even though they have high SINR. A coordination group is handled in many ways, according to embodiments disclosed herein, to improve SINR for a distressed terminal.

According to an embodiment, a power push-pull technique facilitates transmission for distressed terminals at the expense of transmission for non-distressed terminals. Each sector transmits data to its own terminal in a defined slot, and one low SINR (distressed) terminal is paired with one or more sacrificial terminals in the slot. The transmit power for the distressed terminal is boosted and, simultaneously, power for the sacrificial terminal(s) is reduced. The distressed terminal effectively attains better SINR because of "push" from the higher power and the "pull" from the lower interference. On the other hand, the sacrificial terminal loses some SINR. However, the sacrificial terminal can still maintain a desired minimum acceptable level or quality of service.

Figure 2:
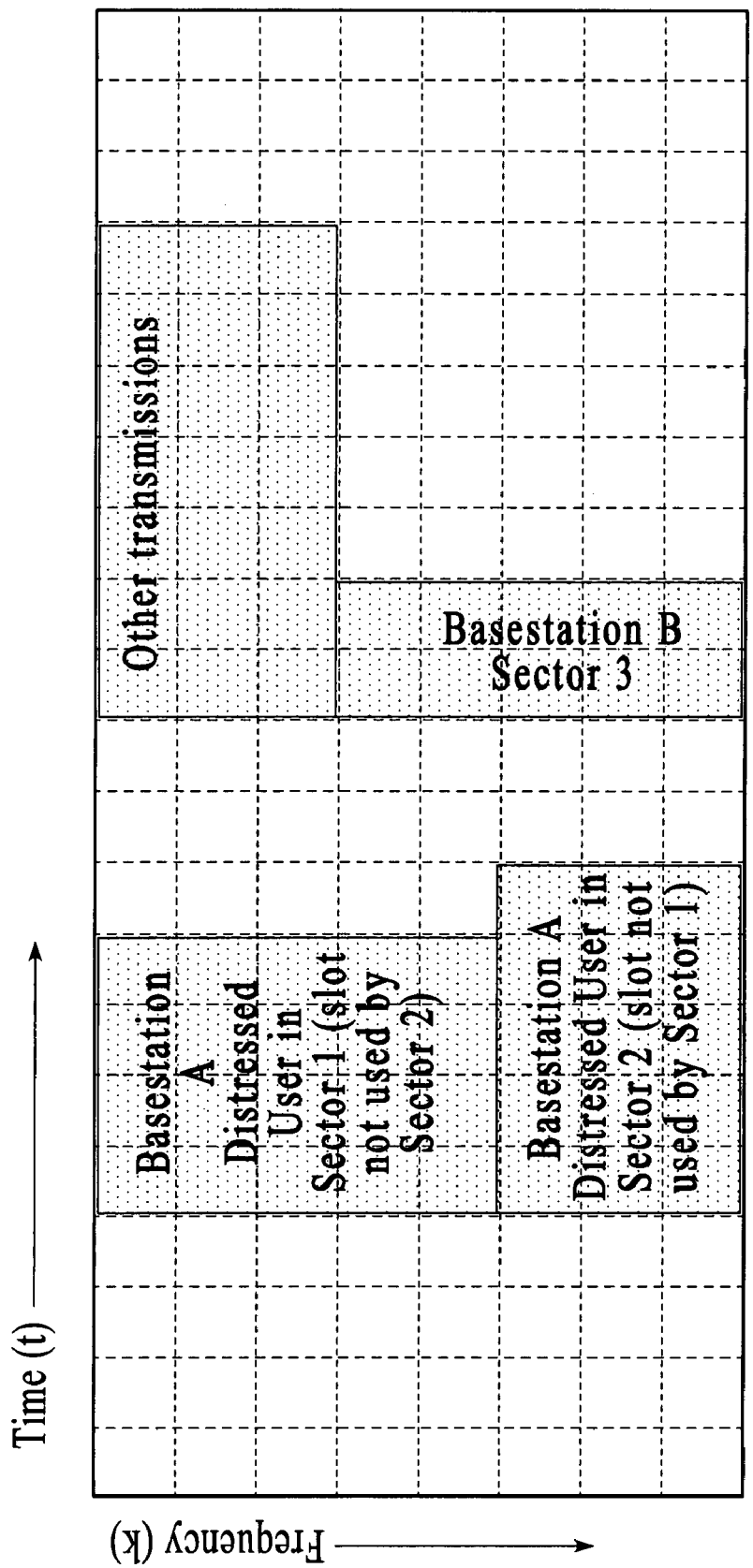
FIG. 2 is a diagram illustrating a time-frequency schedule for an interference killing scheme according to an embodiment.

FIG. 2 is a diagram illustrating a time-frequency schedule for an interference killing scheme of another embodiment in which interference affecting distressed terminals is killed. For example, only the sector containing a distressed terminal transmits in the defined slot. The other sectors shut down transmission. This immediately improves the distressed terminal's SINR because significant interference is removed. As shown in FIG. 2, the upper left time-frequency slot is used by base station A and a distressed terminal (referred to as a "user") in sector 1. This slot is not used by sector 2. The lower left time-frequency slot is used by base station A and a distressed terminal in sector 2. This slot is not used by sector 1. To the right of the previously described slots there are slots for other transmissions and for base station B in sector 3. The diagram shows that there is no interference for the terminal in sector 1 or the terminal in sector 2.

In another embodiment, a coordination group contains only one, generally distressed, terminal and more than one base station transmits the same signal. According to this co-transmission method, the terminal receives multiple superimposed copies of the signal, and thus benefits from additional power and certain forms of diversity. Interference is greatly reduced. Each base station may weight its transmission by a scaling factor to assist the terminal in reception.

Equations 4-6 further illustrate co-transmission. Consider as an example that Base station A transmits on subcarrier k and time t on Sector 1

$$s_{k,t}^{(1)} = h_{k,t} * u_{k,t}^{(1)}$$ Equation 4 where $u_{k,t}^{(1)}$ is a unit-energy data-symbol intended for a terminal in Sector 1. Base station A transmits on the same subcarrier k and time t in Sector 2

$$s_{k,t}^{(2)} = g_{k,t} * u_{k,t}^{(1)}$$ Equation 5 where $g_{k,t}$ is the channel between Sector 2 and the terminal. The terminal then receives a coherent combination of the two transmissions $$r_{k,t} = (|h_{k,t}|^2 + |g_{k,t}|^2) u_{k,t}^{(1)} + w_{k,t}$$ Equation 6 where $w_{k,t}$ is additive interference (from other cells) and noise. Alternatively, the Sector 1 transmission could be normalized to unity, for example using $h_{k,t}/|h_{k,t}|$, and similarly for Sector 2. This constitutes a form of coherent transmission and requires the downlink channel to be known by the base station.

Figure 3:
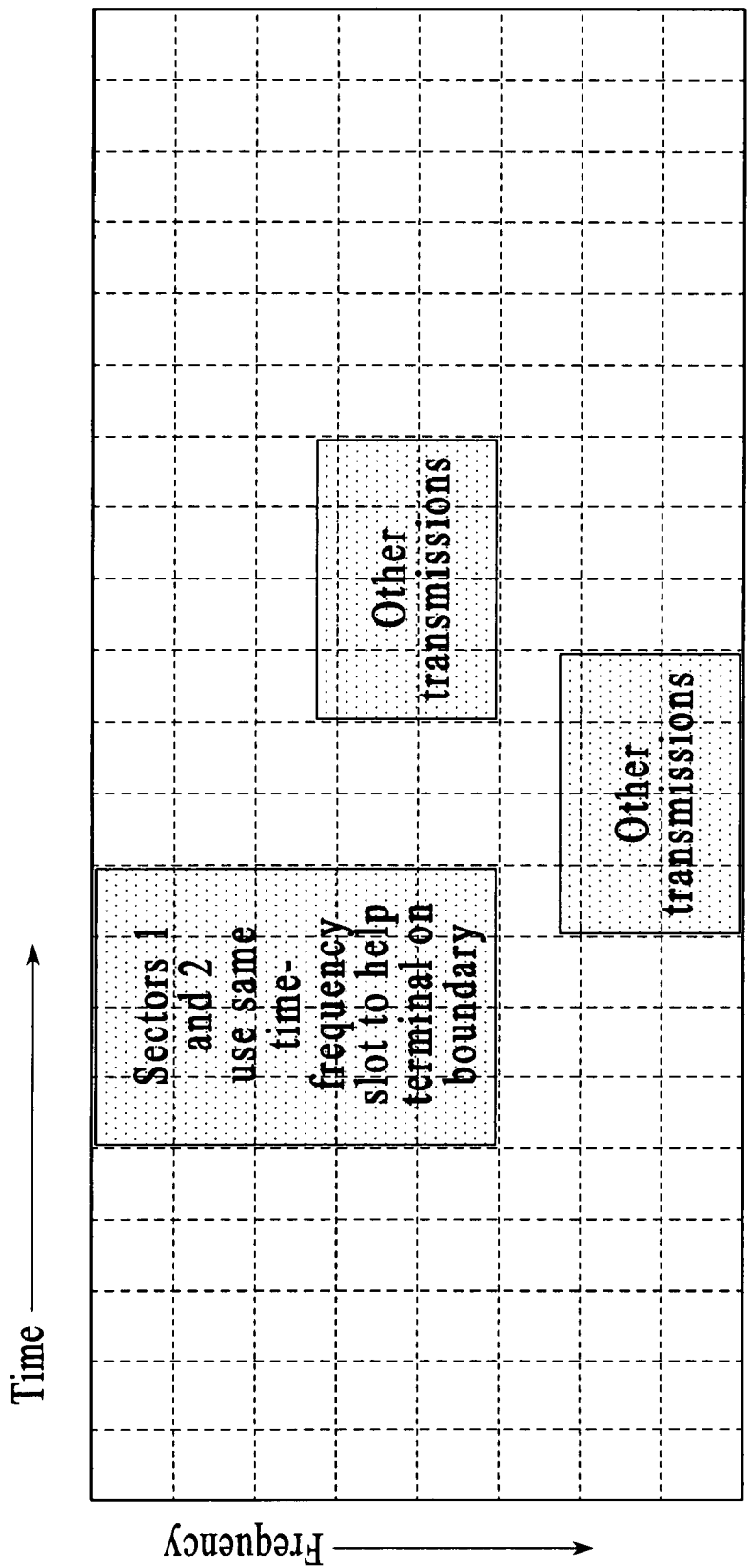
FIG. 3 is a diagram illustrating a time-frequency schedule for a co-transmission scheme according to an embodiment.

FIG. 3 is a diagram illustrating a time-frequency schedule for a co-transmission scheme. Base station A is using the same upper left time-frequency slots to transmit data (on sector 1 and sector 2) to the terminal on the sector boundary.

In a co-transmission scenario in which the base station simply transmits the data on the two sectors without pre-weighting, the terminal receives $$r_{k,t} = (h_{k,t} + g_{k,t}) u_{k,t}^{(1)} + w_{k,t}$$ Equation 7

This method does not require the base station to know the downlink channel.

In a time-division duplex (TDD) system, the uplink (from terminal to base station) and downlink transmissions are slotted in time and occupy the same carrier frequency band. The transmissions are usually alternating: first downlink then uplink then downlink again, and so on in some predefined arrangement. Because the same frequency bands are used, there is often information in the uplink that can be used to determine which terminals suffer from significant interference from adjacent cells or sectors. The terminal can also supply interference measurements or channel quality indicators or use its knowledge of base station pilots (sometimes referred to as the "active set") to determine the relation of its primary channel to the source(s) of interference.

In a frequency-division duplex (FDD) system, the uplink and downlink transmissions use different carrier frequency bands, usually separated far enough apart that measurements in the uplink cannot directly be used on the downlink to infer the quality of channels seen by the terminal and determine the coordination group. In this case, the terminal reports all information to the base station about the nature and source of interference, including, but not limited to, its active set.

In another embodiment, distressed and sacrificial terminals are identified. The base station uses terminal reports of signal strength and SINR observed from different base stations and sectors to determine suitable candidates for the coordination group.

In an embodiment, pseudo-random sequences are aligned. Sectors and cells are often identified and protected by unique pseudo-random bit sequences (PRBSs) either applied to pilots in frequency or time. Thus, to obtain the advantage of coordinated transmission, the sectors or cells are coordinated such that their sequences are the same for the coordination group. In an embodiment, this is accomplished by assigning a time-frequency slot during which the coordination group is handled using a separate transmission protocol with the same PRBS.

In embodiments, various methods previously described are augmented with beamforming using multiple antennas. The multiple antennas may be available locally within a sector or cell. If the multiple antennas are not available locally, they can also be available from across multiple sectors or cells. For example, in an embodiment, the power push-pull method previously described is employed, and a beam is steered toward a distressed terminal in the serving sector and away from the distressed terminal in the interfering sector.

Figure 4:
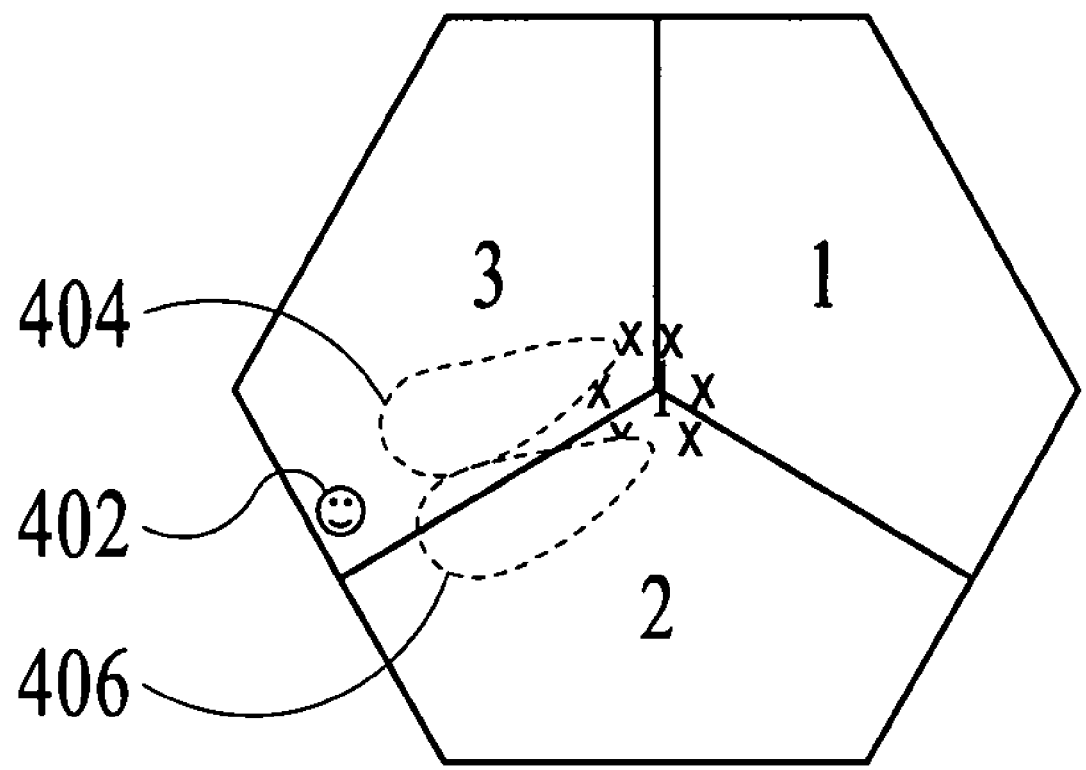
FIG. 4 is a block diagram illustrating the benefit of adding beamforming to aid a terminal according to an embodiment.

In another embodiment employing a co-transmission method as previously described, beams from two different sectors (or cells) are coordinated to the distressed terminal. FIG. 4 is a block diagram illustrating the benefit of adding beamforming to aid a terminal on the Sector 2-3 boundary. Terminal 402 is on the Sector 2-Sector 3 boundary, and is a distressed terminal. However, beam 404 and beam 406 from Sector 3 and Sector 2 are both directed toward terminal 402 to provide improved service.

In an embodiment, beamforming is augmented with spatial multiplexing. For example, in addition to the previously described multiple antenna beamforming, multiple terminals in the same coordination group are handled using simultaneous orthogonal or quasi-orthogonal beams. In such an embodiment, the terminals do not interfere significantly with each other. An embodiment uses a form of spatial multiplexing in which terminals are distinguished based on their spatial signatures.

Methods previously described are further augmented in embodiments with space-time coding using multiple antennas. As used herein, space-time coding refers to a method of encoding the data, potentially using redundancy, and sending the resulting symbols of this code using the available antennas. The multiple antennas can be from across multiple sectors or cells if they are not available locally, or within a sector or cell if they are available locally.

In various embodiments, pilot subcarriers (from which the transmission channel is usually learned at the terminal) are treated in the same way as data subcarriers.

Various embodiments are particularly applicable to systems in compliance with a WiMax standard, such as IEEE 802.16. These embodiments implement coordinated transmission within the WiMax standard in various ways. The WiMax standard defines "zones" where terminals are scheduled according to their requirements for downlink traffic. In various embodiments, WiMax-defined zones are "repurposed" to handle the coordinated-transmission group. One such zone that is repurposed to handle the coordinated-transmission group is the so-called Band-AMC (adaptive channel and modulation) Beamforming Zone. This zone was originally intended for another purpose. One interesting feature of this zone is that there are dedicated pilots used by the terminals to learn the channel. The presence of the pilots allows the transmission protocol to be changed across sectors or cells without adverse effects. In an embodiment, a WiMax-defined zone is repurposed as a "coordinated transmission zone" in which inter-sector or inter-cell coordinated transmission may be used.

As an example for the purpose of illustrating an embodiment, suppose a terminal being served by Base station A, Sector 1 is on the boundary with Sector 2 and it is desirable to create a coordinated transmission zone to put this terminal in a coordination group (as previously described). A time-frequency slot is set aside, and a Band-AMC Beamforming Zone that uses this slot is specified in Sectors 1 and 2.

Sector 2 normally randomizes its transmissions on pilots and data subcarriers with a pseudo-random sequence that is distinct from the sequence used in Sector 1. To create a coordinated transmission zone, the pseudo-random sequence used in Sector 2 is changed to coincide with the sequence in Sector 1 in this time-frequency slot. Once this alignment in time-frequency and pseudo-random sequence is established, the base station can use Sector 2 to augment the transmission in Sector 1 using various methods previously described herein. Because of the presence of the dedicated pilots, the terminal is not aware of the base station behavior and decodes the pilots and data in this zone normally.

Figure 5A:
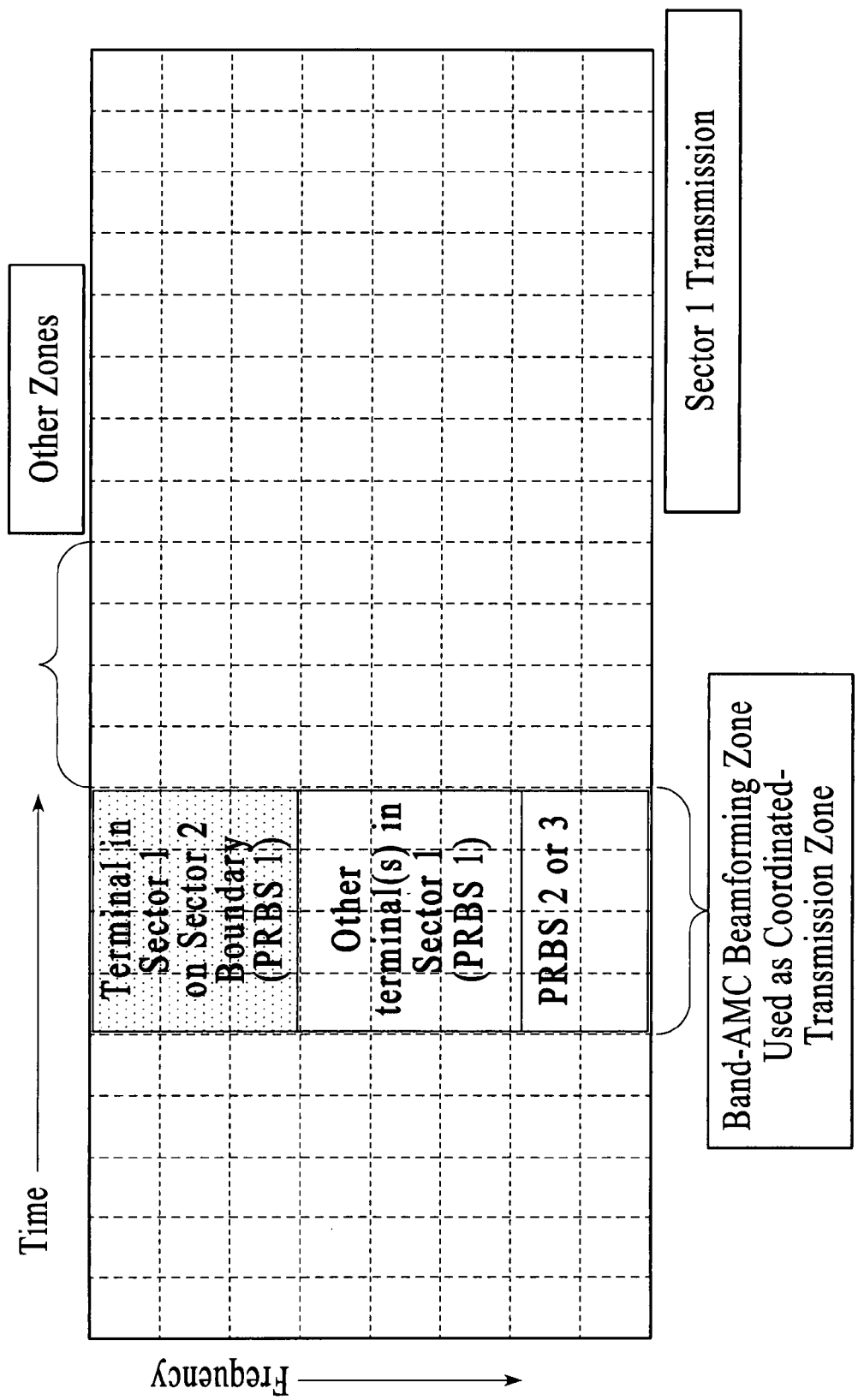
FIG. 5A is a diagram illustrating a time-frequency schedule for a coordinated transmission zone scheme according to an embodiment.

FIG. 5A is a diagram illustrating a time-frequency schedule for a coordinated transmission zone scheme. Sector 1 transmission is shown according to an embodiment. A Band-AMC beamforming zone occupies time-frequency slots as shown. The beamforming zone is used as a coordinated transmission zone. At the top of this coordinated transmission zone is a slot for a terminal in Sector 1 on the Sector 2 boundary, and using PRBS 1. Immediately below this slot is a slot occupied by other terminals in Sector 1 using PRBS 1. Below this slot, and at the bottom of the beamforming zone, is a slot using PRBS 2 or PRBS 3.

Figure 5B:
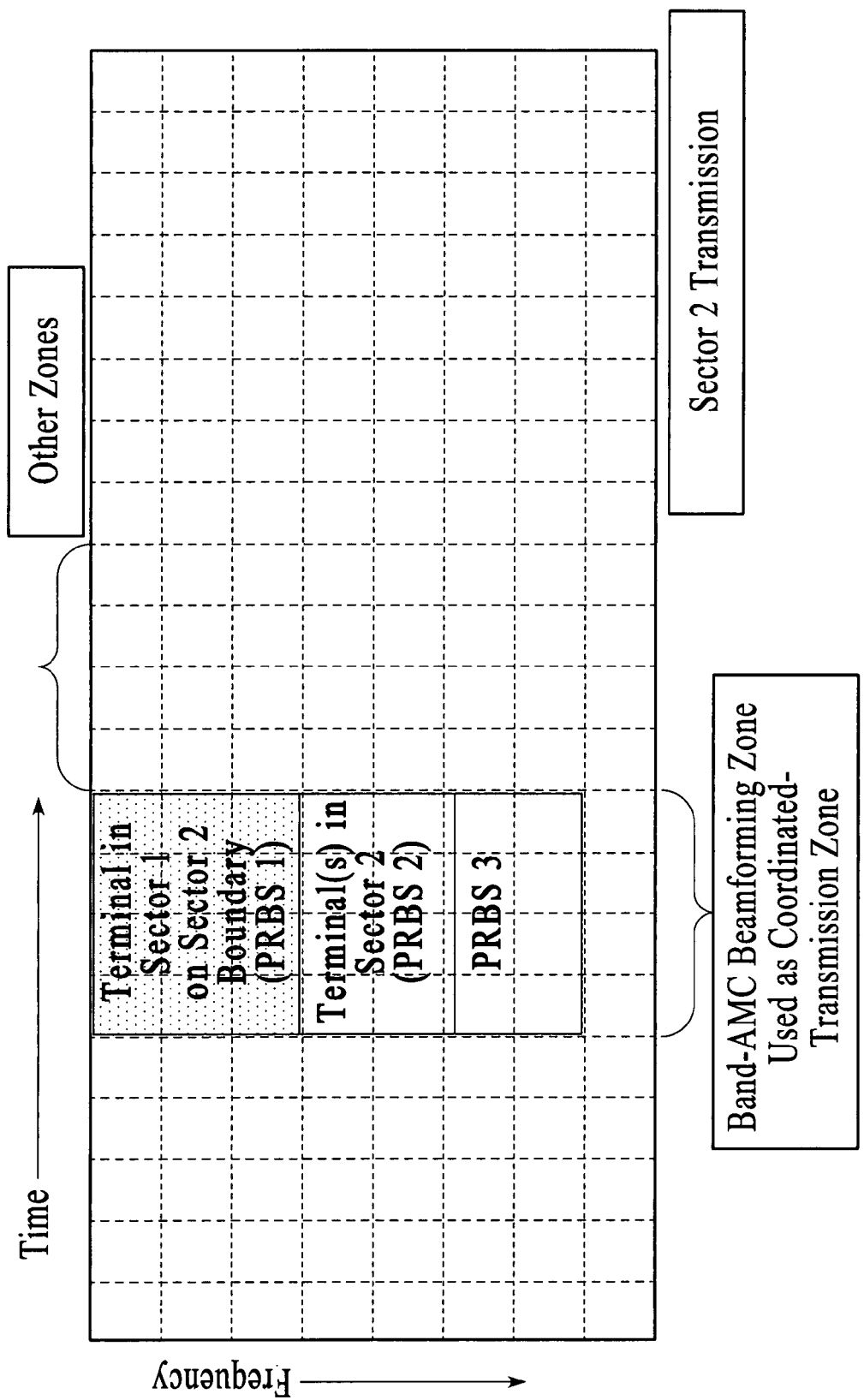
FIG. 5B is a diagram illustrating a time-frequency schedule for a coordinated transmission zone scheme according to an embodiment.

FIG. 5B is a diagram illustrating another time-frequency schedule for a coordinated transmission zone scheme. Sector 2 transmission is shown according to an embodiment. A Band-AMC beamforming zone occupies time-frequency slots as shown. The beamforming zone is used as a coordinated transmission zone. At the top of this coordinated transmission zone is a slot for a terminal in Sector 1 on the Sector 2 boundary, and using PRBS 1. Immediately below this slot is a slot occupied by terminals in Sector 2 using PRBS 2. Below this slot, and at the bottom of the beamforming zone, is a slot using PRBS 3.

In various embodiments, the pseudo-random sequences that are normally different between sectors and cells in a WiMax system are made to be the same within certain sectors or cells and certain time-frequency slots to create coordinated transmission zones within any zone having dedicated pilot channels. For example, as just described, the Band-AMC Beamforming Zone is adapted to implement a coordinated transmission zone in a system with dedicated pilots, such as a WiMax system. In another embodiment, the Partially-Used Subcarrier Beamforming Zone (PUSC-BF) is used to implement a coordinated transmission zone in a system with dedicated pilots, such as a WiMax system. The PUSC implementation of coordinated-transmission is similar to the Band-AMC implementation, with a difference being in the way the subcarriers are categorized into major groups and assigned to terminals.

In yet another embodiment, the Multicast-Broadcast Service Zone (MBS) is used to implement a coordinated transmission zone in a WiMax system. The WiMax standard specifies that, in an MBS zone, the pseudo-random sequence across all sectors and cells must be identical to allow broadcast transmission. Rather than transmit broadcast, coordinated-transmission is used in this zone.

Downlink coordinated transmission in OFDMA systems is described herein, including a cellular communication method, the method comprising: identifying distressed terminals of a plurality of terminals in a cellular network; and coordinating downlink transmission to the plurality of terminals based on the identified distressed terminals, wherein the network comprises cells, and each cell comprises sectors.

In an embodiment, coordinating downlink transmission comprises: designating the plurality of terminals as a group, wherein a terminal comprises a cellular communication device; and handling communications involving a terminal in the group in a preferential manner.

In an embodiment, the cellular communication method comprises an orthogonal-frequency-division multiple-access (OFDMA) method.

In an embodiment, coordinating downlink transmissions comprises preferentially selecting slot allocations of a terminal, wherein a slot comprises a subset of available symbols and available subcarriers in a sector of the terminal.

In an embodiment, the plurality of terminals in the group use a same slot, wherein a slot comprises a subset of available symbols and available subcarriers in a sector of a terminal.

In an embodiment, the plurality of terminals comprises boundary terminals that are on one or more of a sector boundary and a cell boundary.

In an embodiment, the plurality of terminals comprises terminals with a relatively low signal-to-interference ratio (SINR) with respect to other terminals of the plurality of terminals.

In an embodiment, the plurality of terminals comprises: distressed terminals with a low SINR relative to sacrificial terminals; and sacrificial terminals with a high SINR relative to distressed terminals.

In an embodiment, the plurality of terminals comprises distressed terminals with a low SINR relative to sacrificial terminals, and sacrificial terminals with a high SINR relative to distressed terminals, the method further comprising: a sector transmitting data to a terminal in an allocated slot; and pairing a distressed terminal with one or more sacrificial terminals such that transmit power for the distressed terminal is increased while transmit power for the sacrificial terminal is decreased.

In an embodiment, the plurality of terminals comprises distressed terminals with a low SINR relative to sacrificial terminals, and sacrificial terminals with a high SINR relative to distressed terminals, the method further comprising selecting slot allocations of a sector comprising a distressed terminal to correspond with slots in which other sectors are not transmitting.

In an embodiment, the plurality of terminals comprises a single terminal that has a relatively low SINR compared to other terminals of the plurality of terminals, the method further comprising: multiple base stations transmitting a same signal to the single terminal; and the single terminal receiving copies of the same signal from each of the multiple base stations.

In an embodiment, each of the multiple base stations weights its transmission by a scaling factor.

In an embodiment, designating the plurality of terminals comprises: receiving base station reports from multiple sectors, wherein the reports comprise one or more of signal strength and SINR for terminals in the sectors; and analyzing the reports to determine terminals to designate.

In an embodiment, the plurality of terminals is distributed across multiple sectors and multiple cells, the method further comprising aligning pseudo-random bit sequences (PRBS) of the multiple sectors and multiple cells.

In an embodiment, aligning comprises assigning a time-frequency slot during which the plurality of terminals is handled using a separate transmission protocol with a same PRBS.

An embodiment further comprises: steering a beam toward a distressed terminal in a serving sector; and steering a beam away from a distressed terminal in an interfering sector.

In an embodiment, steering comprises beamforming using multiple antennas from at least one of a sector and a cell.

In an embodiment, steering comprises beamforming using multiple antennas from across at least one of one or more sectors and one or more cells.

An embodiment further comprises: designating the distressed terminal in the serving sector and the distressed terminal in the interfering sector as being in the plurality if terminals in the group; and using simultaneous orthogonal beams to reduce interference between the distressed terminal in the serving sector and the distressed terminal in the interfering sector.

An embodiment further comprises: designating the distressed terminal in the serving sector and the distressed terminal in the interfering sector as being in the plurality if terminals in the group; and using simultaneous quasi-orthogonal beams to reduce interference between the distressed terminal in the serving sector and the distressed terminal in the interfering sector.

An embodiment further comprises coordinating beams from two different sectors to the single terminal.

An embodiment further comprises coordinating beams from two different cells to the single terminal.

An embodiment further comprises performing space-time coding of the data to be transmitted; and transmitting the coded data using available antennas, wherein the available antennas comprise multiple antennas from at least one of a sector and a cell.

An embodiment further comprises performing space-time coding of the data to be transmitted; and transmitting the coded data using available antennas, wherein the available antennas comprise multiple antennas from at least one of one or more sectors and one or more cells.

In an embodiment, handling communications comprises handling pilot subcarriers in a same manner as data subcarriers.

Downlink coordinated transmission in OFDMA systems as described herein further include an orthogonal-frequency-division multiple-access (OFDMA) communication method, comprising: identifying distressed terminals of a plurality of terminals in a cellular network; and coordinating downlink transmission to the plurality of terminals based on the identified distressed terminals, wherein the network comprises cells, and each cell comprises sectors.

In an embodiment, coordinating downlink transmission comprises: designating the plurality of terminals as a group, wherein a terminal comprises a cellular communication device; and handling communications involving a terminal in the group in a preferential manner.

In an embodiment, the plurality of terminals in the group will use a same slot, wherein a slot comprises a subset of available symbols and available subcarriers in a sector of a terminal.

In an embodiment, the plurality of terminals comprises boundary terminals that are on one or more of a sector boundary and a cell boundary.

In an embodiment, wherein the plurality of terminals comprises terminals with a relatively low signal-to-interference ratio (SINR).

In an embodiment, the plurality of terminals comprises: distressed terminals with a low SINR relative to a sacrificial terminal; and sacrificial terminals with a high SINR relative to a distressed terminal.

Downlink coordinated transmission in OFDMA systems as described herein further include a computer-readable medium having stored thereon instruction, that when executed in a cellular communication system, cause a communication method to be performed, the method comprising:

identifying distressed terminals of a plurality of terminals in a cellular network; and coordinating downlink transmission to the plurality of terminals based on the identified distressed terminals, wherein the network comprises cells, and each cell comprises sectors.

Downlink coordinated transmission in OFDMA systems as described herein further include an orthogonal-frequencydivision multiple-access (OFDMA) cellular communication method: identifying distressed terminals of a plurality of terminals in a cellular network; and coordinating downlink transmission to the plurality of terminals based on the identified distressed terminals, comprising designating a time-frequency slot for assisting the identified distressed terminals.

An embodiment further comprises specifying a transmission zone that uses the time-frequency slot, wherein terminals are scheduled in the transmission zone according to their respective requirements for downlink traffic.

In an embodiment, the transmission zone comprises a dedicated pilot used by terminals to learn a channel.

An embodiment further comprises changing one or more pseudo-random bit sequences (PRBSs) used in one or more of multiple sectors in the transmission zone such that the PRBSs of the multiple sectors coincide.

An embodiment further comprises using one sector in the transmission zone to augment transmission in another sector in the transmission zone.

In an embodiment, the transmission zone is an adaptive channel and modulation (AMC) beamforming zone.

In an embodiment, the transmission zone is a partially-used subcarrier beamforming zone (PUSC-BF).

In an embodiment, the transmission zone is a multicast-broadcast service zone (MBS).

In an embodiment, the transmission zone allows at least one of inter-sector and inter-cell coordinated transmission.

In an embodiment, the distressed terminals comprise terminals with a relatively low SINR compared to other terminals of the plurality of terminal.

An embodiment further comprises: a sector transmitting data to a terminal in a designated slot; and pairing a distressed terminal with one or more sacrificial terminals such that transmit power for the distressed terminal is increased while transmit power for the sacrificial terminal is decreased.

In an embodiment, the plurality of terminals comprises a single distressed terminal, the method further comprising: multiple base stations transmitting a same signal to the single distressed terminal; and the single distressed terminal receiving a copy of the signal from each of the multiple base stations.

In an embodiment, each of the multiple base stations weights its transmission by a scaling factor.

In an embodiment, identifying distressed terminals comprises: receiving base station reports from multiple sectors, wherein the reports comprise one or more of signal strength and SINR for terminals in the sectors; and analyzing the reports to determine distressed terminals.

An embodiment further comprises: steering a beam toward a distressed terminal in a serving sector; and steering a beam away from a distressed terminal in an interfering sector.

In an embodiment, steering comprises beamforming using multiple antennas from at least one of a sector and a cell.

In an embodiment, steering comprises beamforming using multiple antennas from across at least one of one or more sectors and one or more cells.

An embodiment further comprises: using simultaneous orthogonal beams to reduce interference between the distressed terminal in the serving sector and the distressed terminal in the interfering sector.

An embodiment further comprises using simultaneous quasi-orthogonal beams to reduce interference between the distressed terminal in the serving sector and the distressed terminal in the interfering sector.

An embodiment further comprises coordinating beams from two different sectors to the single terminal.

An embodiment further comprises coordinating beams from two different cells to the single terminal.

An embodiment further comprises: performing space-time coding of the data to be transmitted; and transmitting the coded data using available antennas, wherein the available antennas comprise multiple antennas from at least one of a sector and a cell.

An embodiment further comprises: performing space-time coding of the data to be transmitted; and transmitting the coded data using available antennas, wherein the available antennas comprise multiple antennas from at least one of one or more sectors and one or more cells.

In an embodiment, handling communications comprises handling pilot subcarriers in a same manner as data subcarriers.

Downlink coordinated transmission in OFDMA systems as described herein further include a computer-readable medium having stored thereon instruction, that when executed in a cellular communication system, cause an orthogonal-frequency-division multiple-access (OFDMA) communication method to be performed, the method comprising: identifying distressed terminals of a plurality of terminals in a cellular network; and coordinating downlink transmission to the plurality of terminals based on the identified distressed terminals, comprising designating a time-frequency slot for assisting the identified distressed terminals.

An embodiment further comprises specifying a transmission zone that uses the time-frequency slot, wherein terminals are scheduled in the transmission zone according to their respective requirements for downlink traffic.

In an embodiment, the transmission zone comprises a dedicated pilot used by terminals to learn a channel.

In an embodiment, the method further comprises changing one or more pseudo-random bit sequences (PRBSs) used in one or more of multiple sectors in the transmission zone such that the PRBSs of the multiple sectors coincide.

In an embodiment, the method further comprises using one sector in the transmission zone to augment transmission in another sector in the transmission zone.

Aspects of the methods described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiments may also be implemented as microcontrollers with memory (such as electrically erasable programmable read-only memory ("EEPROM")), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., hypertext transfer protocol ("HTTP"), file transfer protocol ("FTP"), simple mail transfer protocol ("SMTP"), etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other methods, and not only for the methods described above. The elements and acts of the various embodiments described above can be combined to provide further embodiments. These and other changes can be made to methods in light of the above detailed description.

In general, in the following claims, the terms used should not be construed to be limited to the specific embodiments disclosed in the specification and the claims, but should be construed to include all methods that operate under the claims. Accordingly, the methods are not limited by the disclosure, but instead the scope is to be determined entirely by the claims. While certain aspects are presented below in certain claim forms, the inventors contemplate the various aspects in any number of claim forms. For example, while only one aspect is recited as embodied in a machine-readable medium, other aspects may likewise be embodied in a machine-readable medium. Accordingly, the inventors reserve the right to add additional claims after filing the application to pursue such additional claim forms for other aspects as well.

What is claimed is:

1. A cellular communication method, the method comprising:
    identifying a distressed terminal of a plurality of terminals in a cellular network, wherein the distressed terminal is identified as receiving downlink transmission signals having an signal to interference and noise ratio (SINR) less than a threshold; and
    coordinating downlink transmission to the plurality of terminals based on at least the identified distressed terminal, wherein the network comprises cells, and each cell comprises sectors; wherein
    coordinating the downlink transmission comprises multiple base stations transmitting a same signal to the identified distressed terminal; and the distressed terminal receiving a copy of the same signal from each of the multiple base stations, comprising selecting pseudo-random bit sequences (PRBS), and aligning the PRBS of the multiple sectors and multiple cells, wherein the aligning comprises assigning a time-frequency slot for the identified distressed terminal;
    wherein the plurality of terminals comprises distressed terminals with a low SINR relative to sacrificial terminals, and sacrificial terminals with a high SINR relative to distressed terminals, the method further comprising:
    a sector transmitting data to a terminal in an allocated slot; and
    pairing a distressed terminal with one or more sacrificial terminals such that transmit power for the distressed terminal is increased while transmit power for the sacrificial terminal is decreased;
    designating a distressed terminal in a serving sector and a distressed terminal in an interfering sector as being in the plurality of terminals; and
    using beams to reduce interference between the distressed terminal in the serving sector and the distressed terminal in the interfering sector.

2. The method of claim 1, wherein coordinating downlink transmission comprises:
    designating the plurality of terminals as a group, wherein a terminal comprises a cellular communication device; and
    handling communications involving a terminal in the group in a preferential manner.

3. The method of claim 2, wherein the plurality of terminals in the group use a same slot, wherein a slot comprises a subset of available symbols and available subcarriers in a sector of a terminal.

4. The method of claim 2, wherein designating the plurality of terminals comprises:
    receiving base station reports from multiple sectors, wherein the reports comprise one or more of signal strength and SINR for terminals in the sectors; and
    analyzing the reports to determine terminals to designate.

5. The method of claim 2, wherein handling communications comprises handling pilot subcarriers in a same manner as data subcarriers.

6. The method of claim 1, wherein the cellular communication method comprises an orthogonal-frequency-division multiple-access (OFOMA) method.

7. The method of claim 1, wherein the plurality of terminals comprises boundary terminals that are on one or more of a sector boundary and a cell boundary.

8. The method of claim 1, wherein the plurality of terminals comprises terminals with a relatively low signal-to-interference ratio (SINR) with respect to other terminals of the plurality of terminals.

9. The method of claim 1, wherein the plurality of terminals comprises:
    distressed terminals with a low SINR relative to sacrificial terminals; and
    sacrificial terminals with a high SINR relative to distressed terminals.

10. The method of claim 1, wherein the plurality of terminals comprises distressed terminals with a low SINR relative to sacrificial terminals, and sacrificial terminals with a high SINR relative to distressed terminals, the method further comprising selecting slot allocations of a sector comprising a distressed terminal to correspond with slots in which other sectors are not transmitting.

11. The method of claim 1, wherein the plurality of terminals comprises a single terminal that has a relatively low SINR compared to other terminals of the plurality of terminals, the method further comprising:
multiple base stations transmitting a same signal to the single terminal; and
the single terminal receiving copies of the same signal from each of the multiple base stations.

12. The method of claim 11, wherein each of the multiple base stations weights its transmission by a scaling factor.

13. The method of claim 11, further comprising coordinating beams from two different sectors to the single terminal.

14. The method of claim 11, further comprising coordinating beams from two different cells to the single terminal.

15. The method of claim 1, further comprising:
steering a beam toward a distressed terminal in a serving sector; and steering a beam away from a distressed terminal in an interfering sector.

16. The method of claim 15, wherein steering comprises beamforming using multiple antennas from at least one of a sector and a cell.

17. The method of claim 15, wherein steering comprises beamforming using multiple antennas from across at least one of one or more sectors and one or more cells.

18. The method of claim 1, further comprising:
performing space-time coding of the data to be transmitted; and
transmitting the coded data using available antennas, wherein the available antennas comprise multiple antennas from at least one of a sector and a cell.

19. The method of claim 1, further comprising:
performing space-time coding of the data to be transmitted; and
transmitting the coded data using available antennas, wherein the available antennas comprise multiple antennas from at least one of one or more sectors and one or more cells.

20. An orthogonal-frequency-division multiple-access (OFDMA) communication method, comprising:
identifying a distressed terminal of a plurality of terminals in a cellular network, wherein the distressed terminal is identified as receiving downlink transmission signals having an signal to interference and noise ratio (SINR) less than a threshold; and
coordinating downlink transmission to the plurality of terminals based on at least the identified distressed terminal, wherein the network comprises cells, and each cell comprises sectors; wherein
coordinating the downlink transmission comprises multiple base stations transmitting a same signal to the identified distressed terminal; and the distressed terminal receiving a copy of the same signal from each of the multiple base stations, comprising selecting pseudo-random bit sequences (PRBS), and aligning the PRBS of the multiple sectors and multiple cells, wherein the aligning comprises assigning a time-frequency slot for the identified distressed terminals;
wherein the plurality of terminals comprises distressed terminals with a low SINR relative to sacrificial terminals, and sacrificial terminals with a high SINR relative to distressed terminals, the method further comprising:
a sector transmitting data to a terminal in an allocated slot; and
pairing a distressed terminal with one or more sacrificial terminals such that transmit power for the distressed terminal is increased while transmit power for the sacrificial terminal is decreased;
designating a distressed terminal in a serving sector and a distressed terminal in an interfering sector as being in the plurality of terminals; and
using beams to reduce interference between the distressed terminal in the serving sector and the distressed terminal in the interfering sector.

21. The method of claim 20, wherein coordinating downlink transmission comprises:
designating the plurality of terminals as a group, wherein a terminal comprises a cellular communication device; and
handling communications involving a terminal in the group in a preferential manner.

22. The method of claim 21, wherein the plurality of terminals in the group will use a same slot, wherein a slot comprises a subset of available symbols and available subcarriers in a sector of a terminal.

23. The method of claim 20, wherein the plurality of terminals comprises boundary terminals that are on one or more of a sector boundary and a cell boundary.

* * * * *